Oct. 31, 1967   J. ULDERUP   3,350,122
BALL JOINT DEVICE
Filed March 24, 1965
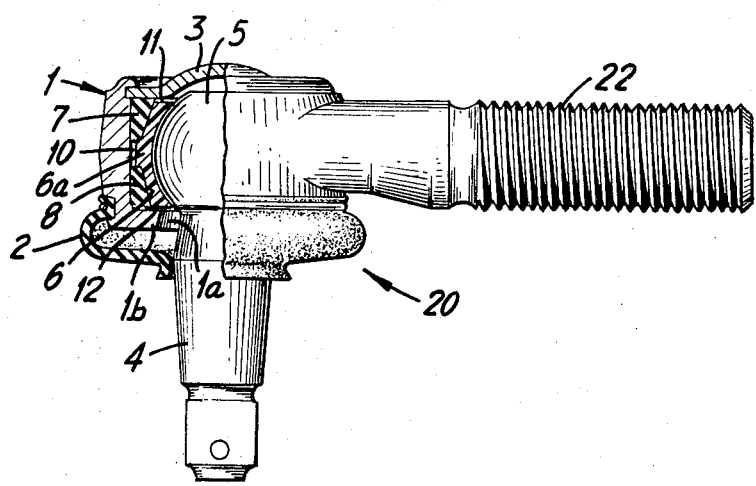
INVENTOR.
JÜRGEN ULDERUP
BY
M⁣cGlew & Toren
ATTORNEYS.

United States Patent Office 3,350,122
Patented Oct. 31, 1967

3,350,122
BALL JOINT DEVICE
Jürgen Ulderup, Bergstrasse, Lemforde,
Hannover, Germany
Filed Mar. 24, 1965, Ser. No. 442,428
Claims priority, application Germany, Apr. 13, 1964,
U 10,653
2 Claims. (Cl. 287—90)

ABSTRACT OF THE DISCLOSURE

A single universal joint construction is disclosed which includes a linkage member having a formation at one end comprising a housing for a universal joint. In accordance with the invention, a one-piece bearing member or bearing box is supported in said housing between two resilient ring members, one of which bears against a cover member at one end and the other of which bears against a ledge formation on the housing opening which permits the passage of a hinge pin therethrough. The hinge pin is provided with a ball end which is pivotally and universally supported directly on the surface of the bearing box member. The bearing box member is provided with an annular projection at a central location within the housing which is spaced from the inner wall of the housing and which bears against the respective ring members so that the bearing box member is supported for elastic movement in axial as well as transverse directions. The bearing box member is advantageously slotted at its outer ends so that it can move in an axial direction.

Summary of the invention

This invention relates in general to the construction of universal joints, and in particular to a new and useful universal joint, particularly for steering and control linkages of motor vehicles, with an improved bearing lining support construction for the ball end of the hinge member.

The present invention is an improvement over prior art constructions, particularly in respect to the housing and internal lining construction for the ball end of the pivot or hinge member. The construction includes a bearing box or lining which is supported within the housing between spaced annular resilient elements or ring members. The ring members are held at each end of the housing by a projecting annular collar of the lining which in turn is spaced from the interior wall of the housing by an amount sufficient to permit its lateral movement therein. The construction is such that the bearing box or lining is supported in the joint housing wtih elastically variable play, both in direction of the hinge pin axis and in respect to a central transverse zone of the spherical pin head.

In a preferred construction, the bearing box is advantageously made of an elastic material of great hardness, and the elastic rings arranged around each end thereof are made of an elastic of lesser hardness. The annular collar or projection on the bearing box is such that it is spaced from the interior wall of the housing to define an annular vertical slot permitting movement of the ball member of the hinge pin against the bearing box in all directions. The construction permits the joint to be designed simply and to permit the joint to transmit greater loads without impairing the ease of movement of the joint. This is achieved principally by a construction which permits the bearing box to have a greater yielding possibility at higher loads due to the play in both radial and axial directions within the housing. While the play is possible, there is still an elastic form-closed connection between the joint housing and the ball end of the hinge pin through the bearing box and the supporting rings during all movement.

Accordingly, it is an object of the invention to provide an improved universal joint construction.

A further object of the invention is to provide a universal joint construction having a bearing box or lining element advantageously made of a resilient material which is mounted within a housing in a manner permitting it to have elastically variable play, both in the direction of the hinge pin axis and in a central transverse zone surrounding the spherical pin head.

A further object of the invention is to provide a universal joint which is simple in design, rugged in construction, and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

The only drawing figure in the case is a partial elevational and partial transverse sectional view of a universal joint constructed in accordance with the invention.

Referring to the drawing in particular, the invention embodied therein comprises a universal joint generally designated 20 including a connecting linkage member or pin 22 which is articulated in respect to the pivot member or hinge pin 4 of the universal joint.

In accordance with the invention, the universal joint includes a tubular housing or outer member generally designated 1 which is open at each end but is closed at its upper end by means of a cover or locking cap 3 which is wedged into an annular groove formed at the interior upper end of the housing 1. The lower end of the housing 1 is provided with an opening 1a for accommodating the hinge pin 4 having a ball-shaped or spherical end 5. The lower end of the housing 1 is also provided with an inturned annular lower portion or wall 1b defining an internal ledge for supporting an annular lining or bearing box 6 made of a hard elastic or plastic material and spaced annular elastic ring elements 7 and 8.

In accordance with a feature of the invention, the bearing box element 6 is provided with an annular collar or radially projecting portion 6a in the central portion thereof which is spaced from the interior wall of the housing 1 to define an annular vertical slot 10.

The bearing box 6 is supported by the elastic ring 7 or 8 against the housing 1 and against the locking cap 3 and the ledge 1b, respectively. The radial slot 10 permits additional radial movement of the ball end 5 of the hinge pin 4 on the bearing box 6 without excessive stress on the elastic bearing and supporting means which include the bearing box 10, the elastic rings 7 and 8, and the housing 1. The collar portion 6a also provides an axial support for the elastic rings 7 and 8 which bear, in turn, at their outer ends on the top 3 and the ledge 1b, respectively. It is advantageous that the elastic rings 7 and 8 be dimensioned so that they would be inserted under initial stress between the bearing box 6 and the housing 1.

An elastic gasket member 2 is secured to the hinge pin 4 at its one end and is clamped over an exterior portion of the housing 1 at its opposite end.

A further feature of the construction is that the bearing box 6 is made to a dimension such that slots 11 and 12 are provided at each end thereof to permit additional yielding of the bearing box in axial directions in respect to the hinge pin 4 as well as in radial directions.

The form-closing fixing of the ball end 5 of the hinge pin 4 within the housing 1 in all directions insures an automatic adjustment of the joint and avoids the possibility that any vibrations or shocks which occur will have a harmful effect on the satisfactory operation and life of the joint.

In order to obtain a good sliding capacity between the ball end 5 and the bearing box 6 and between the bearing box 6 and the supporting rings 7 and 8, the elastic bearing means can be made of a material with a low frictional value or the surfaces of the bearing parts which move relative to each other can be provided with friction reducing means, such as a coating, or the like.

While a specific embodiment of the invention has been shown and described in detail to illustrate the application of the inventive principles, it will be understood that the invention may be embodied otherwise without departing from such principles.

What is claimed is:

1. A universal joint, particularly for steering and control linkages of motor vehicles, comprising a tubular housing closed at one end and having an opening at the opposite end with an interior ledge adjacent said opening, a one piece integral plastic bearing box in said housing, a hinge pin extending through the opening of said housing and having a spherical end elastically supported for movement in all directions in said bearing box, and means for supporting said bearing box within said housing with elastically variable play both in directions of the hinge pin axis and in transverse directions, said means for supporting said bearing box within said housing including two elastic rings spaced in an axial direction in respect to the axis of said hinge pin, said rings bearing along their entire outer peripheries and ends against the interior and each end of said housing respectively, said bearing box having a collar extending radially outwardly between said rings but being spaced from the interior of said housing, the inner periphery of said elastic rings and the outer periphery of said bearing box having complementary frusto-conical surfaces in engagement with each other and converging toward said collar, and said elastic rings also having slots at each end permitting additional yielding of the bearing box in axial directions.

2. A universal joint according to claim 1, wherein said bearing box is made of a material of great hardness and wherein said elastic rings are of a material of less hardness and greater elasticity.

References Cited

UNITED STATES PATENTS

| 1,985,728 | 12/1934 | Ingersoll | 287—90 |
| 2,100,642 | 11/1937 | Geyer | 287—88 X |
| 2,490,972 | 12/1949 | Lear | 287—85 X |
| 3,220,755 | 11/1965 | Gottschald et al. | 287—87 |
| 3,273,924 | 9/1966 | Maxeiner | 287—90 |
| 3,282,602 | 11/1966 | Willingshofer et al. | 287—90 X |

FOREIGN PATENTS 805,830  5/1951  Germany.

CARL W. TOMLIN, *Primary Examiner.*

A. V. KUNDRAT, *Assistant Examiner.*